United States Patent
Picco et al.

(10) Patent No.: US 12,288,053 B2
(45) Date of Patent: Apr. 29, 2025

(54) AUTOMATIC CONTAINER SPECIFICATION FILE CREATION AND UPDATE FOR A CODEBASE

(71) Applicant: INTERNATIONAL BUSINESS MACHINES CORPORATION, Armonk, NY (US)

(72) Inventors: Gabriele Picco, Dublin (IE); Vasileios Vasileiadis, Dublin (IE); Thanh Lam Hoang, Maynooth (IE); Natalia Mulligan, Dublin (IE); Inge Lise Vejsbjerg, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 17/657,605

(22) Filed: Mar. 31, 2022

(65) Prior Publication Data

US 2023/0315421 A1 Oct. 5, 2023

(51) Int. Cl.
G06F 8/65 (2018.01)
G06F 8/10 (2018.01)

(52) U.S. Cl.
CPC . *G06F 8/65* (2013.01); *G06F 8/10* (2013.01)

(58) Field of Classification Search
None
See application file for complete search history.

(56) References Cited

U.S. PATENT DOCUMENTS

| | | | |
|---|---|---|---|
| 10,324,708 B2 | 6/2019 | Griffin et al. | |
| 10,379,841 B2 | 8/2019 | Wong et al. | |
| 10,901,700 B2 | 1/2021 | Wang et al. | |
| 11,200,157 B1* | 12/2021 | Mathew | G06F 11/3688 |
| 11,354,120 B1* | 6/2022 | Zhang | G06F 8/72 |
| 11,620,128 B1* | 4/2023 | Chawda | G06F 8/75 |
| | | | 717/120 |
| 2014/0122435 A1* | 5/2014 | Chavda | G06F 11/1451 |
| | | | 707/645 |
| 2021/0056211 A1* | 2/2021 | Olson | G06N 3/08 |
| 2021/0255846 A1 | 8/2021 | Mamgain et al. | |
| 2023/0009997 A1* | 1/2023 | Bregman | G06F 11/3688 |

FOREIGN PATENT DOCUMENTS

CN 110851167 A 2/2020

OTHER PUBLICATIONS

Cepuc et al., "Implementation of a Continuous Integration and Deployment Pipeline for Containerized Applications in Amazon Web Services Using Jenkins, Ansible and Kubernetes," IEEE, 2020, 6pg. (Year: 2020).*

Montgomery et al., "Graph-Driven Dependence Tracking of Container and Package Relationships", IPCOM000253343D, Mar. 2018 (6 pages).

(Continued)

*Primary Examiner* — Ryan D. Coyer
(74) *Attorney, Agent, or Firm* — Jordan T. Schiller

(57) ABSTRACT

Embodiments for providing an enhanced codebase in a computing environment by a processor. One or more container specification files may be automatically updated with one or more changes to a codebase.

17 Claims, 9 Drawing Sheets

(56) References Cited

OTHER PUBLICATIONS

Cepuc et al., "Implementation of a Continuous Integration and Deployment Pipeline for Containerized Application in Amazon Web Services Using Jenkins, Ansible and Kubernetes", 2020 19th RoEduNet Conference: Networking in Education and Research, 2020, pp. 1-6, doi: 10.1109/RoEduNet51892.2020.9324857 (6 pages).

Zaheer et al., "Deep Sets", 31st Conference on Neural Information Processing Systems (NIPS 2017), Long Beach CA, USA, arXiv:1703.06114, (11 pages).

Yang, Zichao et al., "Hierarchical Attention Networks for Document Classification," Proceedings of the 2016 conference of the North American chapter of the association for computational linguistics: human language technologies, pp. 1480-1489, DOI:10.18653/v1/N16-1174 (10 pages).

"Visual Studio IntelliCode", https://devblogs.microsoft.com/visualstudio/introducing-visual-studio-intellicode/, May 2018, accessed Mar. 31, 2022 (6 pages).

"Top 10 Benefits of Continuous Integration & Continuous Delivery", https://katalon.com/resources-center/blog/benefits-continuous-integration-delivery, accessed Mar. 31, 2022.

"CNCF Survey 2020: Use of Containers in Production has Increased by 300% since 2016", https://www.cncf.io/wp-content/uploads/2020/11/CNCF_Survey_Report_2020.pdf, accessed Mar. 31, 2022, (21 pages).

Benni et al., "Supporting Micro-Services Deployment in a Safer Way: A Static Analysis and Automated Rewriting Approach", SAC '18: Proceedings of the 33rd Annual ACM Symposium on Applied Computing, Apr. 2018, pp. 1706-1715, https://doi.org/10.1145/3167132.3167314 (50 pages).

Gorski et al., "Model Driven Architecture in Containers-Based Software Development", Smart Innovations in Engineering and Technology. ICACON 2017, APCASE 2017. Topics in Intelligent Engineering and Informatics, vol. 15. Springer, Cham , https://doi.org/10.1007/978-3-030-32861-0_10 (296 pages).

Kehrer et al., "Autogenic: Automated Generation of Self-configuring Microservices", In Proceedings of the 8th International Conference on Cloud Computing and Services Science (CLOSER 2018), pp. 35-46, 2018 (12 pages).

Bucchiarone et al., "A Model-Driven Approach Towards Automatic Migration to Microservices", Software Engineering Aspects of Continuous Development and New Paradigms of Software Production and Deployment. Devops 2019. Lecture Notes in Computer Science, vol. 12055. Springer, https://doi.org/10.1007/978-3-030-39306-9_2, (23 pages).

Hassan et al., "RUDSEA: Recommending updates of Dockerfiles via software environment analysis", ASE 2018: Proceedings of the 33rd ACM/IEEE International Conference on Automated Software Engineering, Sep. 2018, pp. 796-801, https://doi.org/10.1145/3238147.3240470 (6 pages).

Henkel et al., "A Dataset of Dockerfiles", In Proceedings of the 17th International Conference on Mining Software Repositories (MSR '20). Association for Computing Machinery, New York, NY, USA, 528-532, https://doi.org/10.1145/3379597.3387498 (5 pages).

GitHub, Gueils / whales, Accessed/Printed on May 23, 2024, pp. 1-7.

GitHub, IBM/Project Code Net: This repository is to support contributions for tools for the Project CodeNet dataset hosted in DAX, Accessed/Printed on May 23, 2024, pp. 1-8.

* cited by examiner

AUTOMATIC CONTAINER SPECIFICATION FILE CREATION AND UPDATE FOR A CODEBASE

BACKGROUND OF THE INVENTION

Field of the Invention

The present invention relates in general to computing systems, and more particularly, to various embodiments for automatically creating and updating one or more container specification files with one or more changes to a codebase by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine learning is a form of artificial intelligence ("AI") that is employed to allow computers to evolve behaviors based on empirical data.

SUMMARY OF THE INVENTION

According to an embodiment of the present invention, a method for providing an enhanced codebase in a computing environment, by one or more processors, is depicted. One or more container specification files may be automatically created and updated with one or more changes to a codebase.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
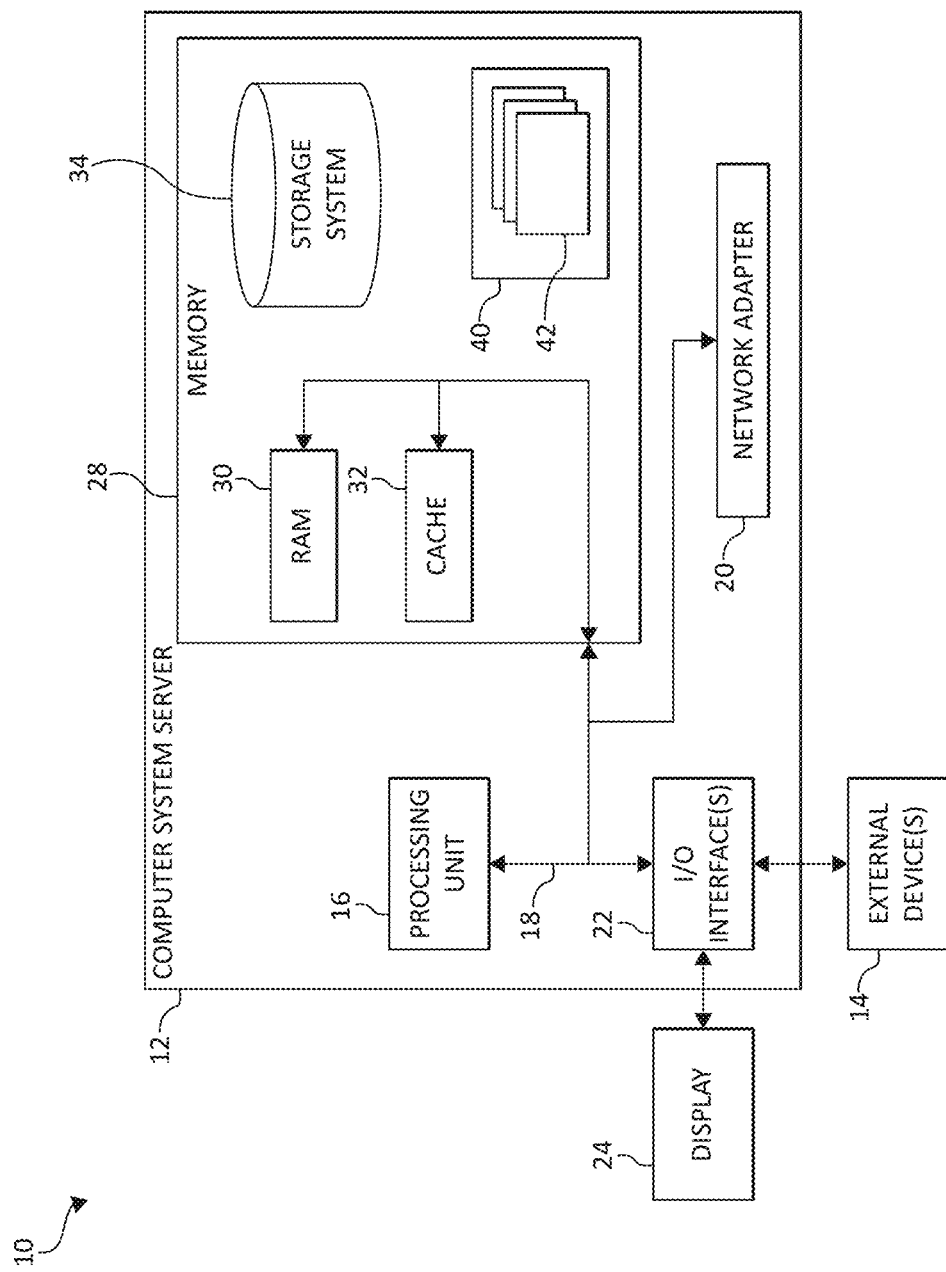
FIG. 1 is a block diagram depicting an exemplary cloud computing node according to an embodiment of the present invention.

Over the last decade, software development and deployment is increasingly managed in distributed and shared computing environments, including but not limited to, cloud computing environments. In the field of software development and deployment, container-based virtualization has been largely adapted where the "containers" provide a layer of abstraction and virtualization for a running application. Container technology is being utilized more and more in production environments and may be configured automatically or manually. Containers play a central role to many Continuous Integration/Continuous Development ("CI/CD") pipelines (e.g., CI/CD for Kubernetes or Openshift).

Currently, deploying a codebase (e.g., a set of code) of an existing application to a containerized cloud platform can be a complicated process with many manual steps. Making decisions about selecting an ideal framework and configuration can be difficult and time consuming, especially for inexperienced users. The existing process can cause an increased delay times to deployment while also presenting problems with choosing invalid configurations and performance tuning issues down the line if users are choosing less than optimal configurations.

Codebases are more than a collection of source code files, data files, and container specification files (e.g., Dockerfiles). Codebases also contain valuable metadata such as, for example, 1) history of changes to files, and 2, a collection of issues explaining problems with the codebase as well as including pointers to a set of changes that are required to fix the problems (e.g., github-issues, and pull requests). These issues may also be annotated with special labels or even contain references to failed CI/CD builds which failed and brought the issue to light.

Codebases also contain valuable metadata such as, for example, developer discussions referencing issues in current and existing codebase as well as CI/CD builds, changelogs of software, etc., and 4) CI/CD metadata such as, for example, successful/failed builds, dependencies between builds (triggers), changes to code leading up to the build, etc. Our invention leverages the entire history and metadata of a codebase to automatically generate and/or update container specification file.

Thus, a need exists for leveraging the entire history and metadata of a codebase to automatically generate and/or update container specification files. Accordingly, the present invention automatically creates and updates one or more container specification files with one or more changes to a codebase in a computing environment. One or more container specification files may be automatically created and updated with one or more changes to a codebase. That is, one or more container specification files may be automatically created and updated with one or more changes to a codebase by leveraging an entire history and metadata of a codebase to automatically generate and/or update container specification files.

In some implementations, the present invention generates container specification files for a codebase. In other implementations, the present invention may automatically suggest and recommend whether a container description needs to be updated to reflect changes to codebase. In other implementations, the present invention may automatically suggest and recommend the updates when a container description needs to be updated to reflect changes to a codebase. In other implementations, the present invention may automatically suggest and recommend the updates when a container description needs to be updated to reflect changes to software dependencies. Thus, the present invention provides for maximum and optimal (e.g., best) effort prediction for each change, including artifacts (that could involve installation of software dependencies, and application/library packages, as well as steps to compile the codebase), ports and volumes. It should be noted that although some specifications such as, for example, ports and volumes can request external information (that may or may not be contained in GitHub, Gitlab, and/or other software management platform that may contain information related to code), the present invention may include a user in-the-loop and/or machine learning to confirm, modify, or override predicted specifications.

In some implementations, a codebase is used as input to a system which then outputs a container specification file suitable to containerize the application. Additionally, the present invention enables a user to provide feedback, adjust, modify and/or amend the generated file for future training rounds.

In some implementations, one or more data repositories (e.g., public repositories such as, for example, all software project (e.g., Github and Gitlab) repositories that contain a container specification file, such as Dockerfile) may be used to 1) learn embeddings and train a generative model that generates container specification files, and/or 2) learn embeddings and train a model to predict container specification attribute values used for refinement.

In other various implementations, the present invention provides for automatically generating an intermediate container specification candidate file given a codebase. The present invention may detect/extract attributes name and value from container specification files, where the input codebase is filtered, summarized and/or embedded. The present invention may predict attributes values for the intermediate container specification file and refine intermediate container specification file with the values predicted. A user interface may be enabled to allow users (e.g., subject matter experts) to amend the container specification file and where users' corrections are used to refine the system. The present invention may collect and prepare training data from public repositories.

In general, as used herein, "optimize" (or "enhanced") may refer to and/or defined as "maximize," "minimize," "most likely," "best," or attain one or more specific targets, objectives, goals, or intentions. Optimize may also refer to maximizing a benefit to a user (e.g., maximize a trained machine learning pipeline/model benefit). Optimize may also refer to making the most effective or functional use of a situation, opportunity, or resource.

Additionally, optimizing need not refer to a best solution or result but may refer to a solution or result that "is good enough" or "most likely" for a particular application, for example. In some implementations, an objective is to suggest a "best" combination of preprocessing operations ("preprocessors") and/or machine learning models/machine learning pipelines, but there may be a variety of factors that may result in alternate suggestion of a combination of preprocessing operations ("preprocessors") and/or machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD- ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
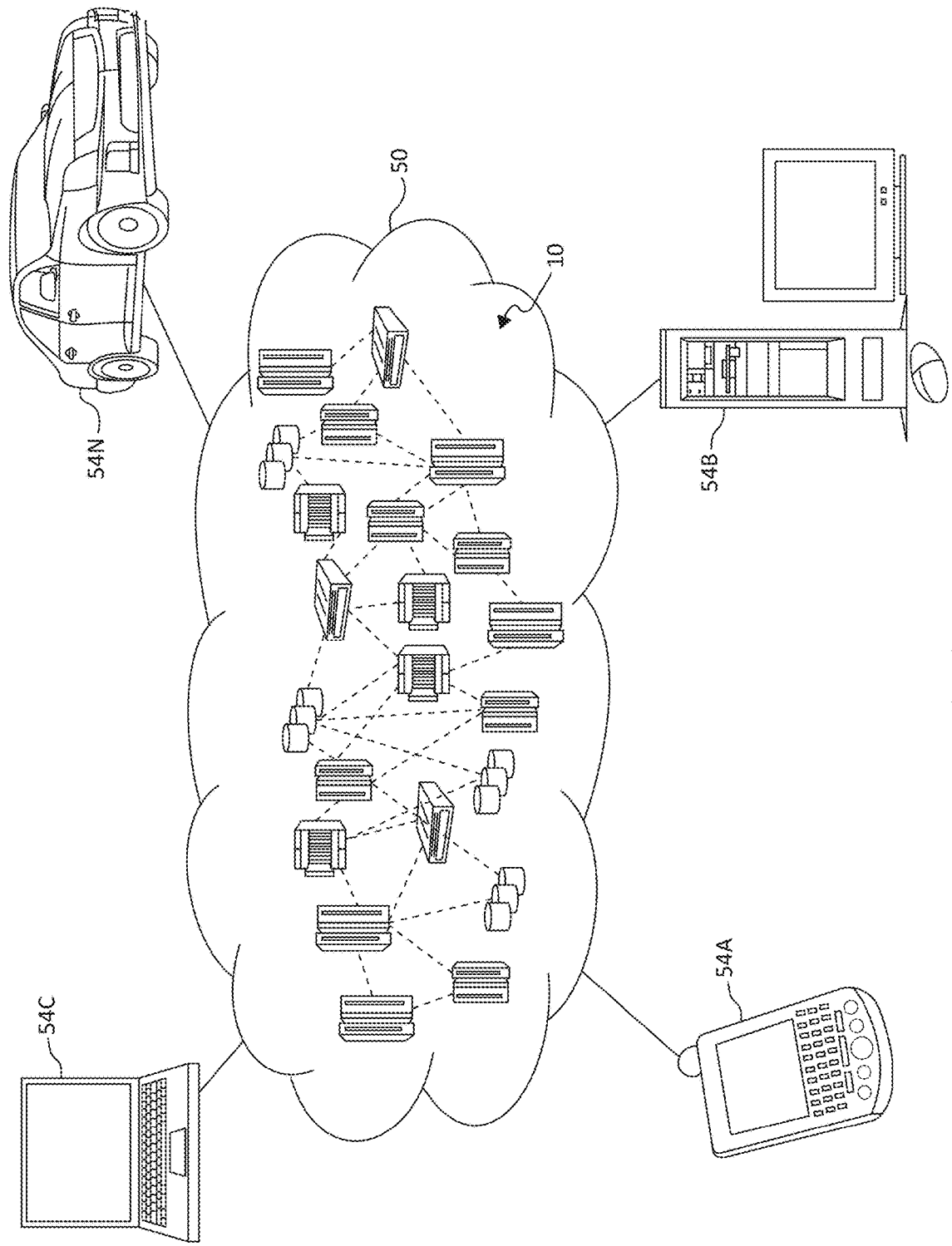
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
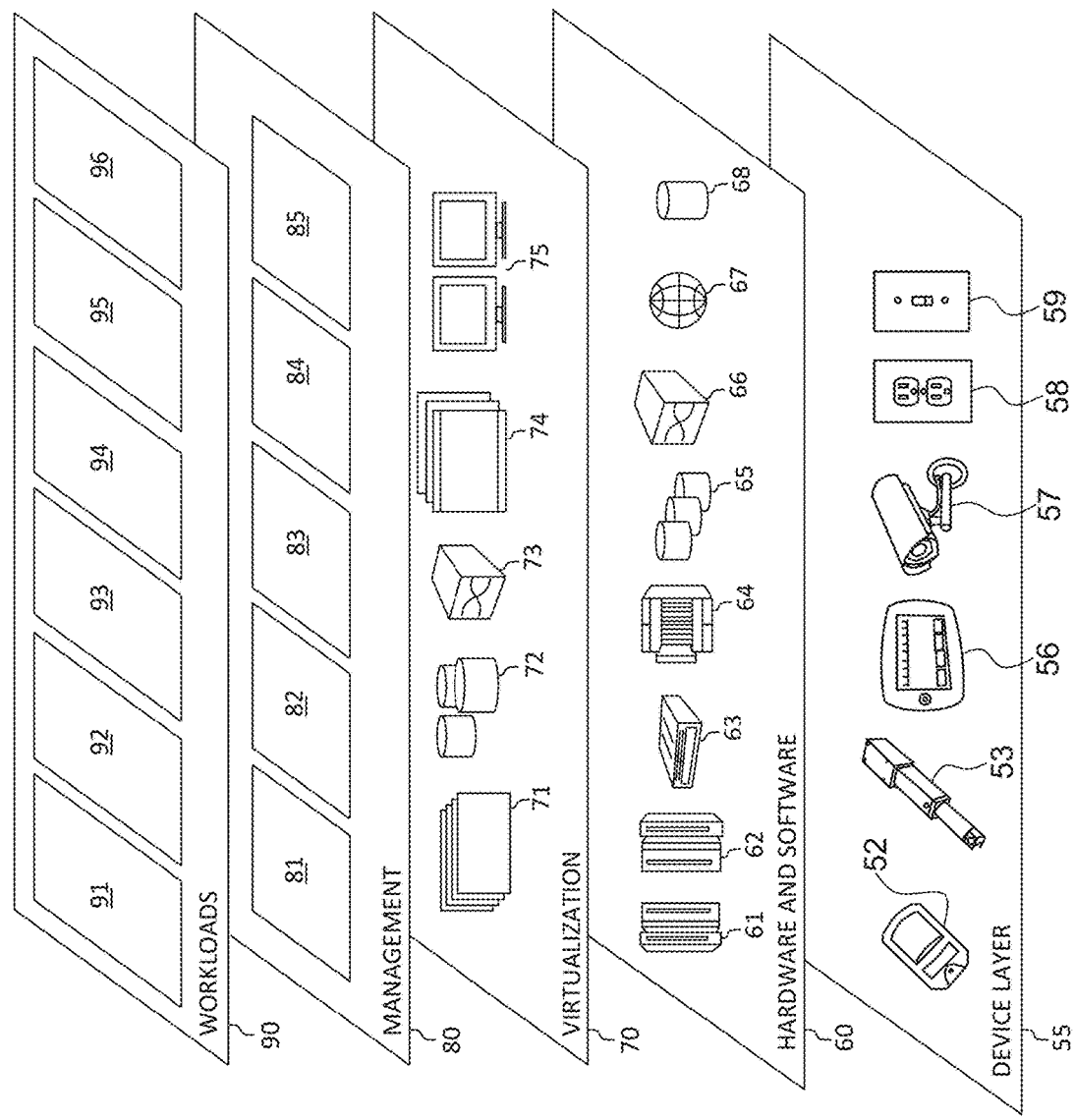
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for automatically creating and updating one or more container specification files with one or more changes to a codebase. In addition, workloads and functions 96 for automatically creating and updating one or more container specification files with one or more changes to a codebase may include such operations as data analytics, data analysis, and as will be further described, notification functionality. One of ordinary skill in the art will appreciate that the workloads and functions 96 for automatically creating and updating one or more container specification files with one or more changes to a codebase may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides novel solutions for automatically updating container specification file to reflect changes to the codebase laying the basis for uninterrupted cloud deployment for the application. In one aspect, the present invention automatically generates a container specification file for a codebase which initially does not have one. In some implementations, the present invention may discover, extract and embeds relevant metadata related to the codebase changes including finding relevant issues and notes, CI/CD build results, references to other issues, software builds, etc. In other implementations, the present invention may discover, extract and embed changes (e.g., "deltas") in the codebase source files. In some implementations, the present invention may suggest whether a container specification of a codebase should be updated. An updated container specification file may be generated based on both collected metadata and source code changes (deltas). In other implementations, the present invention may provide a user interface allow users (e.g., subject matter experts) and/or CI/CD to validate and/or amend the updated container specification file and where users' corrections are used to refine the system. An operation may be executed to collect and prepare training data for both source files and metadata from public repositories.

Figure 4:
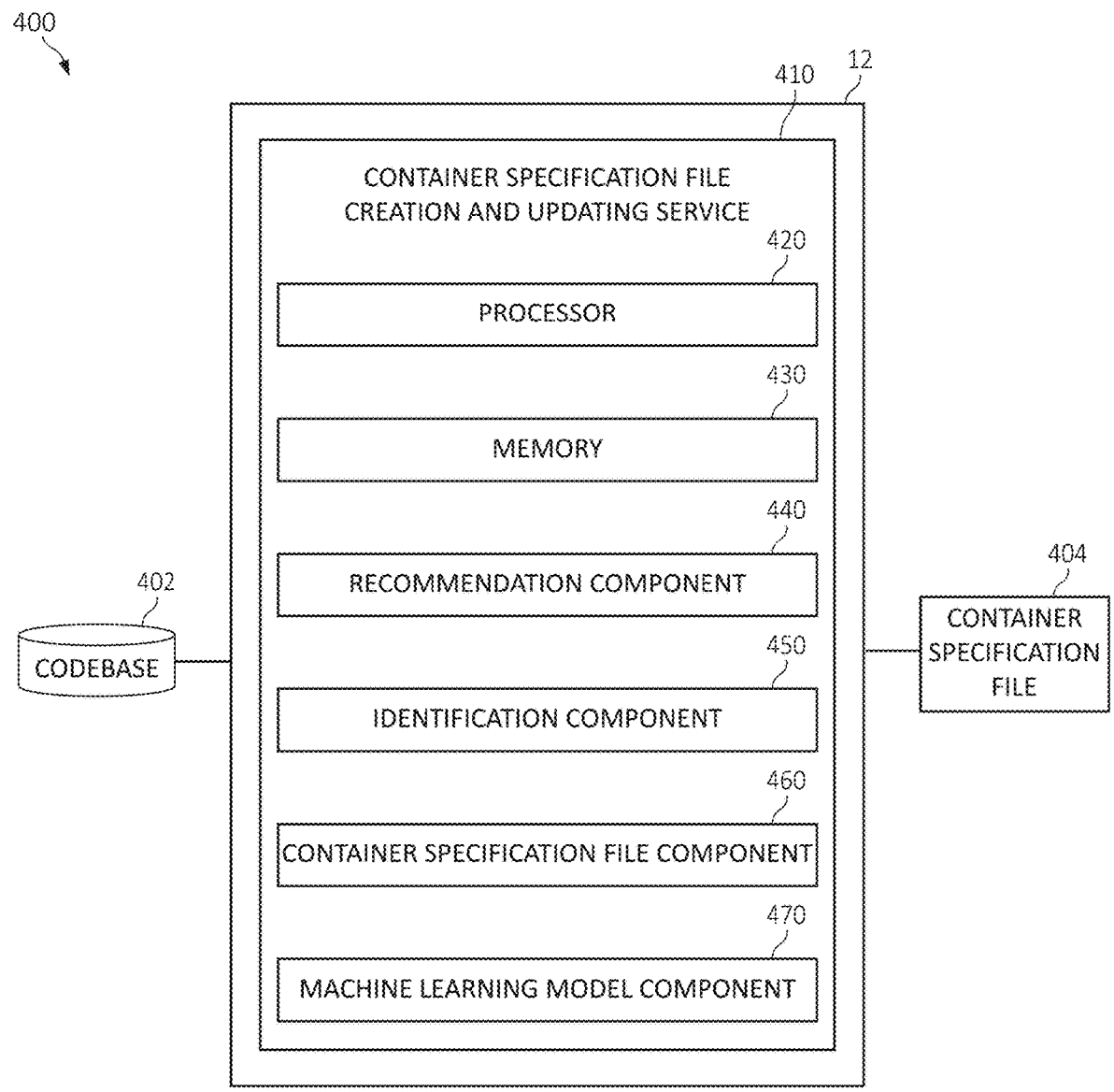
FIG. 4 is an additional block diagram depicting an exemplary functional relationship between various aspects of the present invention.

Turning now to FIG. 4, a block diagram depicting exemplary functional components 400 according to various mechanisms of the illustrated embodiments is shown. In one aspect, one or more of the components, modules, services, applications, and/or functions described in FIGS. 1-3 may be used in FIG. 4. Repetitive description of like elements employed in other embodiments described herein is omitted for sake of brevity.

A container specification file creation and updating service 410 is shown, incorporating processing unit ("processor") 420 to perform various computational, data processing and other functionality in accordance with various aspects of the present invention. The container specification file creation and updating service 410 may be provided by the computer system/server 12 of FIG. 1. The processing unit 420 may be in communication with memory 430. The container specification file creation and updating service 410 may include a recommendation component 440, an identification component 450, a container specification file component 460, and a machine learning model component 470.

As one of ordinary skill in the art will appreciate, the depiction of the various functional units in container specification file creation and updating service 410 is for purposes of illustration, as the functional units may be located within the container specification file creation and updating service 410 or elsewhere within and/or between distributed computing components.

In general, by way of example only, the container specification file creation and updating service 410 may receive as input a codebase 410. The container specification file creation and updating service 410, using the recommendation component 440, the identification component 450, the container specification file component 460, and the machine learning model component 470 may automatically create and/or update one or more intermediate container specification files for the codebase from one or more available data repositories.

The container specification file creation and updating service 410, using the recommendation component 440, the identification component 450, the container specification file component 460, and the machine learning model component 470 may automatically generate one or more container specification files for the codebase from one or more available data repositories. The container specification file creation and updating service 410, using the recommendation component 440, the identification component 450, the container specification file component 460, and the machine learning model component 470 may identify and extract metadata related to the one or more changes the codebase.

The container specification file creation and updating service 410, using the recommendation component 440, the identification component 450, the container specification file component 460, and the machine learning model component 470 may identify, extract, and embed the one or more changes in one or more source files of the codebase.

The container specification file creation and updating service 410, using the recommendation component 440, the identification component 450, the container specification file component 460, and the machine learning model component 470 may suggest to the one or more container specification files to accept the one or more updates made in the codebase.

The container specification file creation and updating service 410, using the recommendation component 440, the identification component 450, the container specification file component 460, and the machine learning model component 470 may automatically update the one or more container specification files based on the one or more changes to the codebase and metadata related to the one or more changes the codebase.

The container specification file creation and updating service 410, using the recommendation component 440, the identification component 450, the container specification file component 460, and the machine learning model component 470 may receive feedback data to validate and amend the one or more changes to the codebase; and collect labeled training data such as files of the codebase and metadata from one or more available data repositories. That is, in order to collect training data, the container specification file creation and updating service 410, using the recommendation component 440, the identification component 450, the container specification file component 460, and the machine learning model component 470 may collect commit/change events to a codebase (e.g., a git repository) and to the container files so that it can create labelled training data for training machine learning models The container specification file creation and updating service 410, using the recommendation component 440, the identification component 450, the container specification file component 460, and the machine learning model component 470 may identify and extract attribute names and values from one or more intermediate container specification files.

The container specification file creation and updating service 410, using the attribute extraction component 440, the attribute value predictor component 450, the container specification file component 460, and the machine learning model component 470 may predict one or more attribute values for one or more intermediate container specification files.

Also, it should be noted that the container specification file component 460 may create a refined version of the container specification file 404 by replacing values of the attributes in container specification candidate file with the ones predicted by the attribute value predictor component 450 (e.g., a codebase attribute value predictor).

The container specification file creation and updating service 410, using the recommendation component 440, the identification component 450, the container specification file component 460, and the machine learning model component 470 may receive feedback, from a user and/or a machine learning operation, and be added to a training corpus and completes a human-in-the-loop cycle. The container specification file creation and updating service 410, using the recommendation component 440, the identification component 450, the container specification file component 460, and the machine learning model component 470 may collect labeled training data including container specification files from one or more available data repositories.

In some implementations, the machine learning model component 470 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
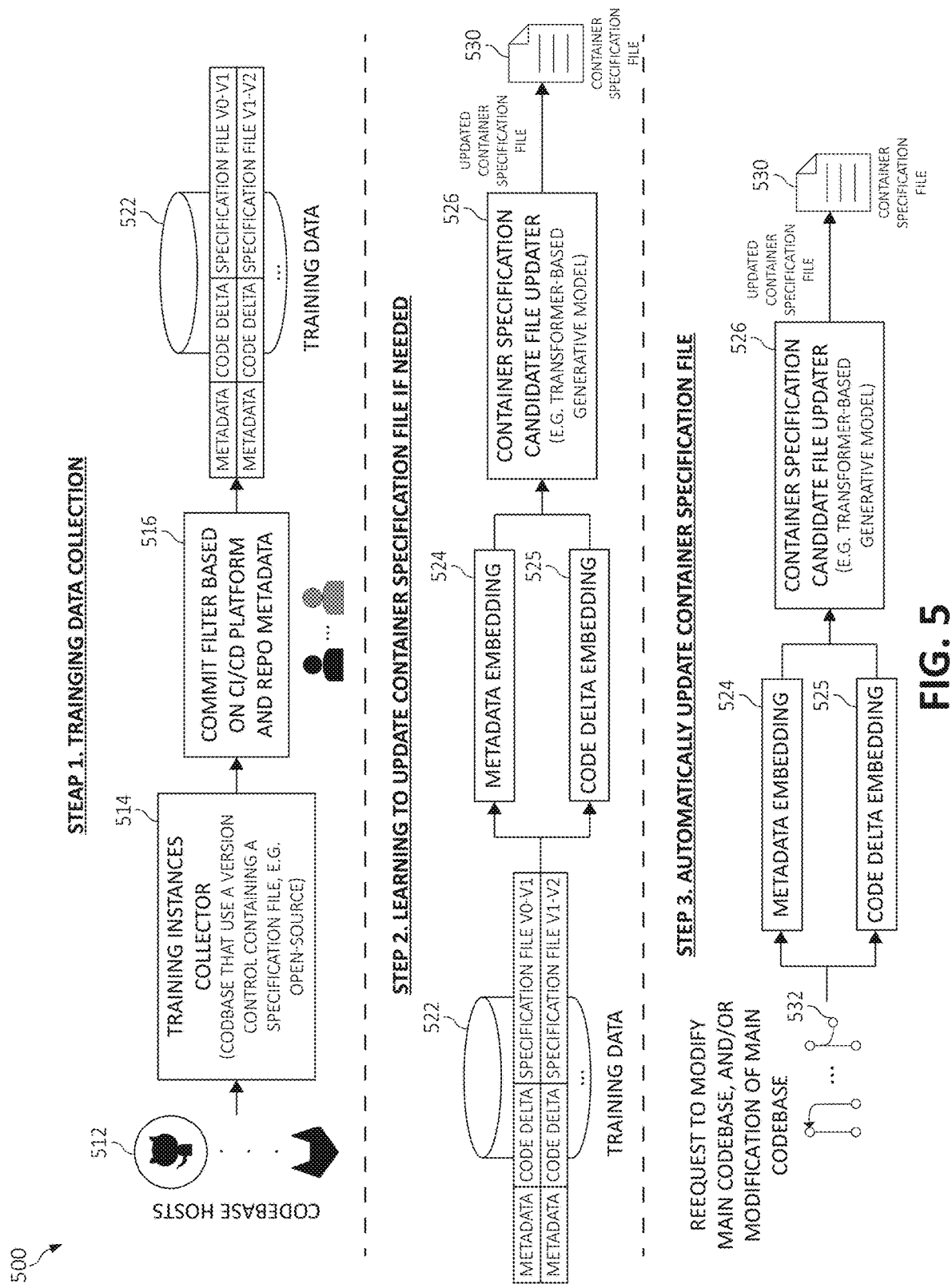
FIG. 5 is a block diagram depicting for training models for automatically creating and updating a container specification file for a codebase according to an embodiment of the present invention.

Turning now to FIG. 5, a block diagram 500 depicts exemplary operations for automatically creating and updating a container specification file for a codebase. In one aspect, one or more of the components, modules, services, applications, and/or functions described in FIGS. 1-4 may be used in FIG. 5. Repetitive description of like elements employed in other embodiments described herein is omitted for sake of brevity.

Starting in a first step, training instances may be collected. In block 512, inputs such as, for a codebase may be provided from a codebase host 512 and provided to a training instances collector 514 (e.g., codebase that uses a version control containing a specification file such as, for example, an opensource codebase containing a container specification file). The data may be processed and analyzed to identify dependencies on other codebases and filter out irrelevant files (e.g., commit filter based on CI/CD platform and codebase metadata), as in block 516, as training data. Simultaneously, training data may be sent to a specification file generator 526 have the codebase and the specification file.

In a second step, a container specification file may be updated based on a learning operation (e.g., machine learning operation). Using the training data from the specification file generator 522, metadata embeddings 524 and code delta embeddings 525 may be provided to a container specification candidate file updater 526. The container specification candidate file updater 526 may provide a summarized codebase (e.g., transformer-based generative model). The container specification candidate file generator 526 may provide a specification file (e.g., an updated container specification file).

In a third step, the container specification candidate file may be automatically updated. An operation may be performed during a request to modify the main codebase (e.g., pull request to a codebase that uses the git source version control framework), or after the modification of the main codebase (e.g., commit to main branch of a codebase that uses the git source version control framework, as in block 532 (e.g., request to modify main codebase, and/or modification of main codebase). Using the metadata embeddings 524 and code delta embeddings 525, a codebase may be provided to the container specification candidate file generator 526. The container specification candidate file updater 526 may update the container specification candidate 530.

Figure 6:
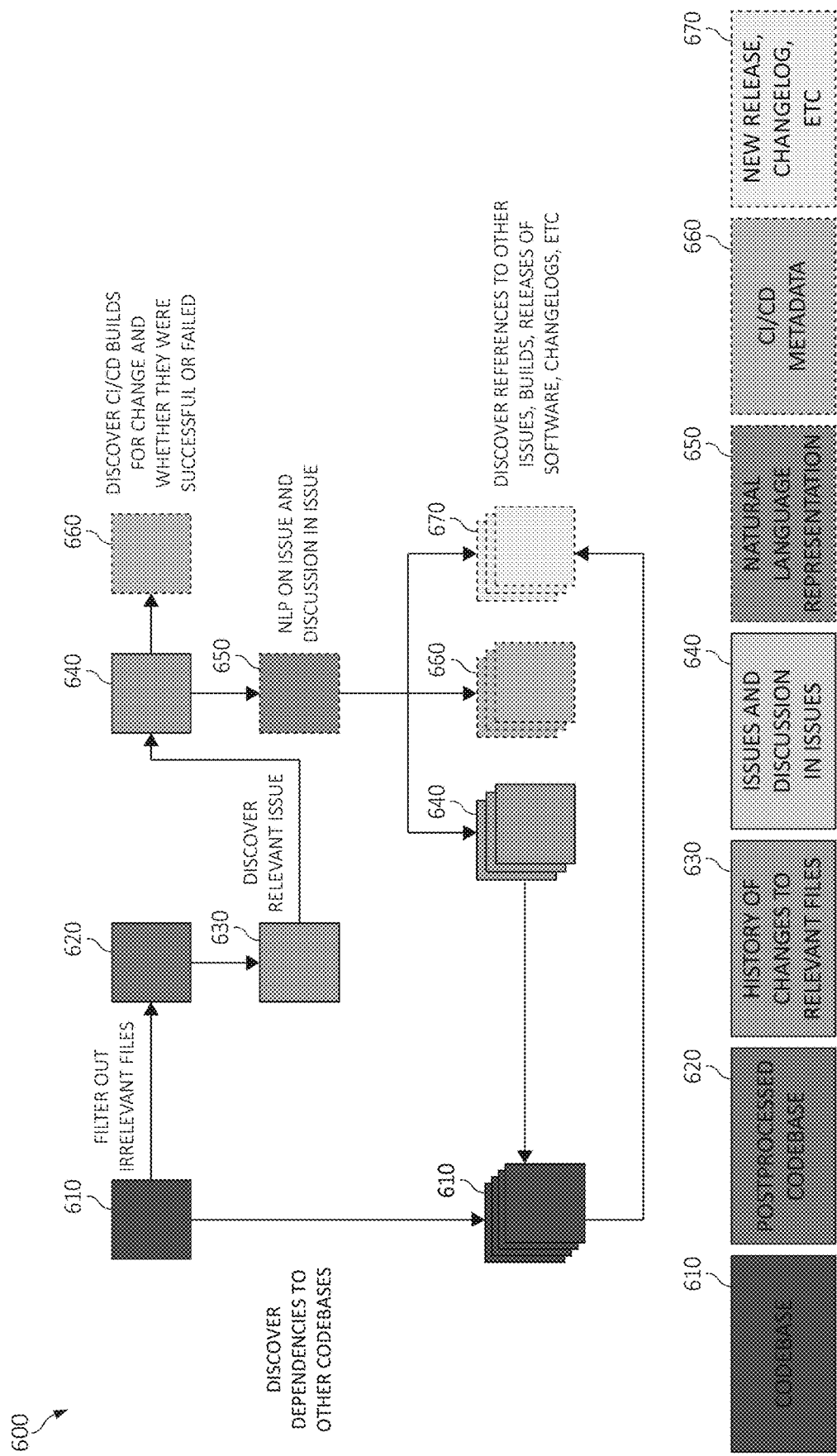
FIG. 6 is an additional block diagram depicting operations for training instances collector for automatically creating and updating a container specification file for a codebase in a computing environment according to an embodiment of the present invention.

FIG. 6 is an additional block diagram depicting operations for training instances collector for automatically creating and updating a container specification file for a codebase in a computing environment according to an embodiment of the present invention. In one aspect, one or more of the components, modules, services, applications, and/or functions described in FIGS. 1-5 may be used in FIG. 6. Repetitive description of like elements employed in other embodiments described herein is omitted for sake of brevity.

As depicted in FIG. 6, starting from a codebase 610, one or more irrelevant files filter out, as in block 620 and one or more dependencies on other codebases may be discovered, as in block 612. From blocks 610, and 620, one or more relevant issues and commits to codebase, as well as pull-requests may be identified as in block 630 and 640 (e.g., history of changes and issues and discussions in issues).

One or more findings may be processed and analyzed to discover references to associated CI/CD builds for changes to codebase, as in block 660. One or more findings may be processed and analyzed using a natural language processing ("NLP"), as in block 650, to discover a) references to other codebases, b) other issues, c) other CI/CD builds, d) one or more references to changelogs of software dependencies, e) references to releases of software dependencies.

It should be noted, various types of input data may be used such as, for example, a) a last known working container specification file (e.g., Dockerfile) prior to changes, b) relevant files (e.g., configurations, and deltas to relevant files that changes introduce including changes to the container specification file, c) an NLP of discussion referencing (e.g., including NLP of referenced item), and/or d) data indicating a status (e.g., success and/or failure data). As output data, the present invention may provide a) contents of the container specification file, b) data indicating the container specification file is valid, c) data indicating the container specification file contained changes, and/or d) changes to the container specification file.

Figure 7:
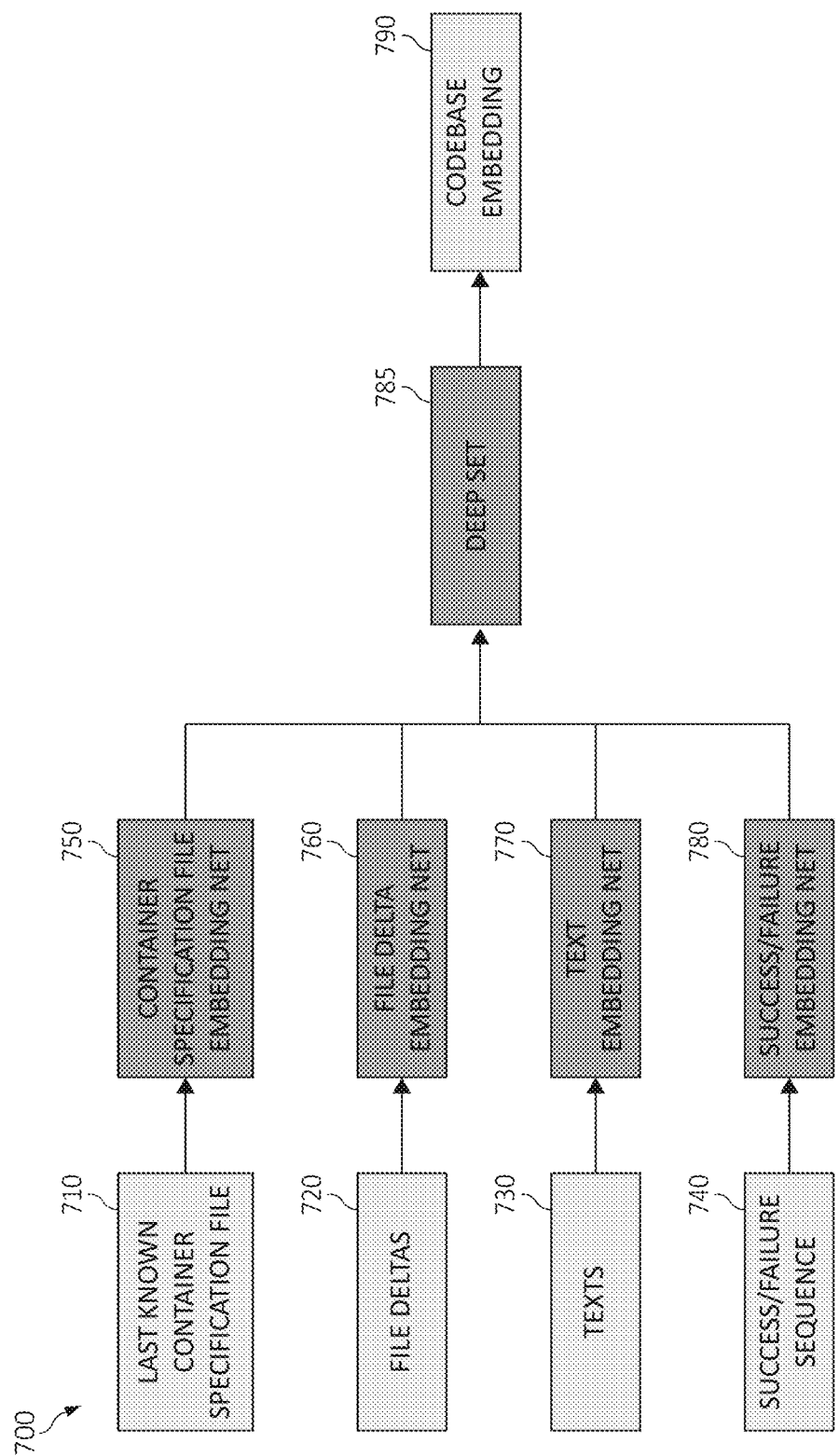
FIG. 7 is an additional block diagram depicting operations for input and encoding for automatically creating and updating a container specification file for a codebase in a computing environment according to an embodiment of the present invention.

FIG. 7 is an additional block diagram 700 depicting operations for input and encoding and decoding and predicting changes for automatically creating and updating a container specification file for a codebase in a computing environment according to an embodiment of the present invention. In one aspect, one or more of the components, modules, services, applications, and/or functions described in FIGS. 1-5 may be used in FIG. 6. Repetitive description of like elements employed in other embodiments described herein is omitted for sake of brevity.

As depicted in FIG. 7, a last known container specification file (e.g., Dockerfile) may be represented as a sequence of tokens, as in block 710. A container specification file embedding may be an output of a neural network that turns a sequence of tokens into an embedding vector, as in block 750. A container specification file embedding network may be pre-trained on a collection of the container specification files collected from a public repository (e.g., a public Github). A delta to a relevant file (e.g., an included delta to the last known container specification file) may be represented as a sequence of actions via a file diff. A "file diff" (often abbreviated as "diff") is a term for comparing the contents of 2 files (e.g., A and to produce a so-called "patch file". The "patch file" describes a sequence of actions to apply on the contents file A that produce the contents of file B or is one way to represent the changes to a relevant file in the codebase (e.g., the container specification file, or other important files such as those containing source code) is to consider the output of "file diff" between the contents of said file between in one snapshot of the codebase versus the contents of.

One or more changes to one or more relevant files may result in a set of file deltas 720. Each file delta 720 may be a sequence of actions and considered as an input to a file delta neural network (e.g., a file delta embedding net) that turn each file delta into an embedding vector, as in block 760. A success/failure commit event may be represented as a sequence of binary values.

In some embodiments, new texts 730 collected from an NLP component may be represented as a set of texts, as in block 770. Each fragment of text may be an input to pretrained language model (e.g., BERT) to turn text into an embedding vector. In one aspect, one or more similar operations may be used to generate embeddings, learning to filter irrelevant information with a hierarchical attention.

A set neural network 785 (e.g., a deep set) may combine a set of embedding vectors to a final codebase embedding vector (e.g., codebase embedding) that may be used by a decoder to predict a new container specification file.

Figure 8:
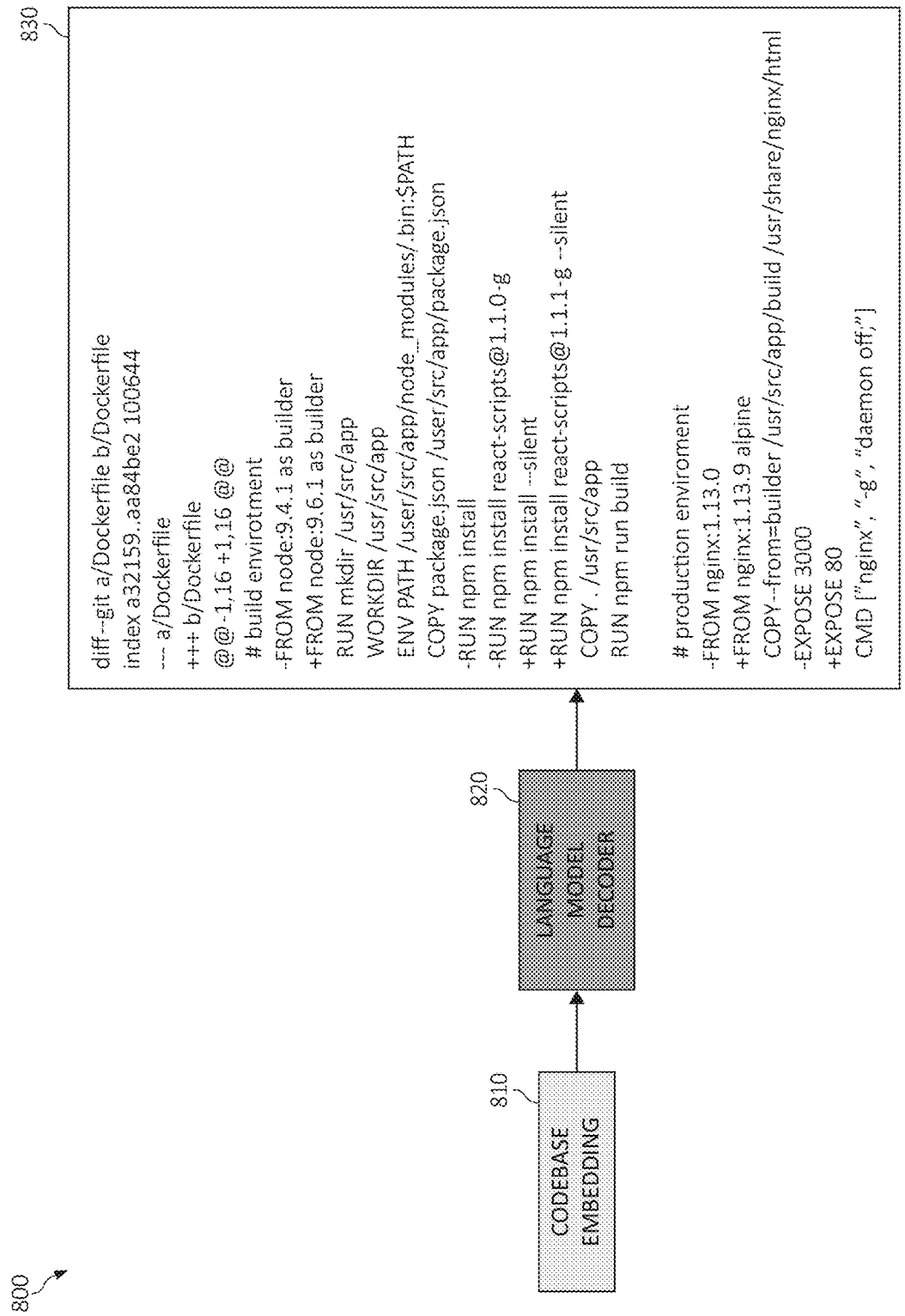
FIG. 8 is an additional block diagram depicting operations for decoding and predicting changes for automatically creating and updating a container specification file for a codebase in a computing environment according to an embodiment of the present invention.

For further explanation, FIG. 8 is a diagram 800 depicting operations for decoding and predicting changes for automatically creating and updating a container specification file for a codebase in a computing environment according to an embodiment of the present invention. In one aspect, one or more of the components, modules, services, applications, and/or functions described in FIGS. 1-7 may be used in FIG. 8. Repetitive description of like elements employed in other embodiments described herein is omitted for sake of brevity.

In some implementations, a decoder may be implemented with a language model (e.g., a language model decor or "decoder"), that is initially pre-trained on collected container specification files (e.g., Dockerfiles). The decoder 820 may be adjusted and tuned (e.g., fine-tuned) to predict a patch 830 such as, for example, a diff output or a serialized git diff (e.g., a diff output which can be stored to a file with a specific schema) from the codebase embedding 810. A "diff output" is a patch file and "git diff" can be used as a "patch file" for source version control systems based on the "git" source version control framework.

In one aspect, in the event there are no changes in the container specification file, the decoder 820 may learn to predict the empty string as git diff. At prediction time, when the changes in the codebase do not require an update of the container specification file, an empty delta may be predicted, leaving the specification file unchanged. That is, there are situations where changing the codebase does not mean that the container specification file needs to change too. In these scenarios, the present invention predicts an empty delta (e.g., a patch) to indicate that the current container specification file need not change. The predicted git diff can then be applied with a git apply predicted-diff operation in order to generate an updated container specification file. The "git apply" is an operation of the "git" source version control framework to apply a patch to the codebase (i.e., modify the codebase by performing on it a sequence of actions). The "predicted-diff" is equivalent to "predicted patch" which is the output of the present invention.

The updated container specification file can be validated/modified by the user and/or automated CI/CD to provide a feedback loop for improving model predictions and system reliability.

Additionally, one or more changes to the container specification file may be predicted. For example, prediction of changes in the container specification file can triggered at any commit and/or pull request on a master file as part of a CI/CD pipeline. A prediction of changes can also be configured to run periodically such as, for example, from a discussion in a public repository (e.g., a discussion on Github) emerge that indicate it would be better to update the version of a node base image.

In other implementations, the present invention may provide for automatically generating and/or updating a command-line of container specification files. In one embodiment, the decoder 820 may be implemented with the language model (e.g., BERT), that is initially pre-trained on collected container specification files (e.g., Dockerfiles). The decoder 820 may then adjusted or fine-tuned to predict the patch 830 (e.g., the serialized git diff such as, for example, in a unified format) from the codebase embedding 810. The patch 830 (e.g., the git diff) may contain a default command-line of the container image. The command-line may contain an absolute path to an executable (or the relative path based on contents of the $PATH environment variable, and a "working directory") optionally followed by zero or more arguments. The output patch of the present invention may contain a command-line. The command-line describes which executable the container image will execute and what arguments to provide to this executable. The command-line specifies which executable to use via the path to the executable which can either be absolute, or relative. An absolute path refers to the location of the executable file with respect to the root directory of the filesystem. The relative path refers to the location of the executable with respect to some other directory. That reference directory is either the "working directory" of the container (i.e., the directory that container image uses as a starting point) or any of the paths that are in the $PATH environment variable. The $PATH environment variable is a convention that some operating systems use to maintain a list of "common" directories that contain executable files.

The decoder 820 may generate the absolute path, and arguments, using the information collected. It should be noted that the codebases collected from block 810 may contain one or more golden container specification files, which may include command-lines. This enables the decoder 820 to learn to associate a codebase (and/or its metadata) with the command-line of the container specification file that it generates/updates. At prediction time, when the changes in the codebase and/or the metadata do not require an update of the container specification file, an empty delta may be predicted, leaving the specification file unchanged. The patch 830 (e.g., the predicted git diff) may then be applied with a git apply predicted-diff in order to generate the updated container specification file. The updated container specification file can be validated/modified by the user and/or automated CI/CD to provide a feedback loop for improving model predictions and system reliability.

It should be noted that "golden data" is a term used in machine learning to indicate data that are very close, if not identical, to the ground truth. In other words, the container specification files that is collected from codebases via 810 as training data may be used. The container specification files are golden because they are designed to containerize their codebase. Therefore, the present invention can use the golden container specification files as training data to learn how to generate/update container specification files for codebases.

Figure 9:
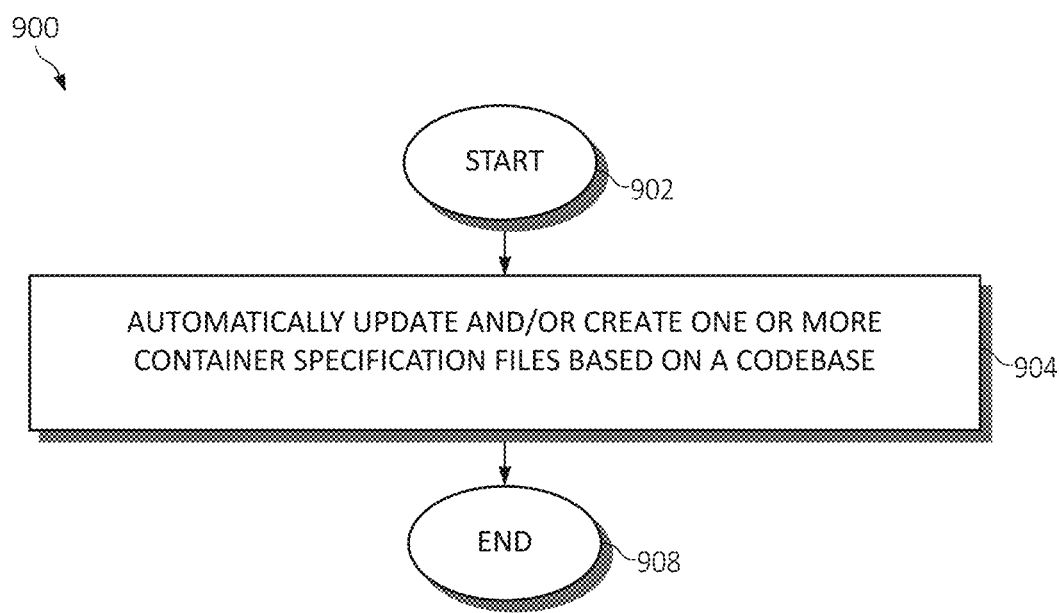
FIG. 9 is a flowchart diagram depicting an additional exemplary method for automatically creating and updating a container specification file for a codebase in a computing environment according to an embodiment of the present invention.

FIG. 9 is a flowchart diagram depicting an exemplary method for providing an enhanced codebase in a computing environment. In one aspect, each of the devices, components, modules, operations, and/or functions described in FIGS. 1-8 also may apply or perform one or more operations or actions of FIG. 9. The functionality 900 may be implemented as a method executed as instructions on a machine, where the instructions are included on at least one computer readable medium or one non-transitory machine-readable storage medium. The functionality 900 may start in block 902.

One or more container specification files may be automatically created and/or updated for a codebase based on one or more extracted attribute names and values, as in block 904. In one aspect, the functionality 900 may end, as in block 906.

In one aspect, in conjunction with and/or as part of at least one block of FIG. 9, the operations of method 900 may include each of the following. The operations of method 900 may automatically generate one or more container specification files for the codebase from one or more available data repositories. The operations of method 900 may identify and extract metadata related to the one or more changes of the codebase and/or metadata related to non-changes of the codebase. The operations of method 900 may identify, extract, and generate embeddings for the one or more changes in one or more source files of the codebase. The operations of method 900 may suggest to the one or more container specification files to accept the one or more updates made in the codebase. The operations of method 900 may automatically update the one or more container specification files based on the one or more changes to the codebase and metadata related to the one or more changes the codebase.

The operations of method 900 may receive feedback data to correct or amend the one or more container specification files. The operations of method 900 may receive feedback data to validate and amend the one or more changes to the codebase; and collect training data (e.g., collect labeled training data) including files contained in the codebase and metadata from one or more available data repositories.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for updating one or more container specification files in a computing environment, comprising:
    learn embeddings from previous container specification files and train a generative model to predict container specification attribute values;
    automatically updating, by the trained generative model based on the container specification attribute values, one or more container specification files with one or more changes to a codebase, the codebase containing a history of changes to one or more files and metadata associated with the codebase containing a collection of source code; and
    enabling a user to provide feedback through a user interface to validate, adjust, modify, or amend the updated one or more container specification files, wherein the user feedback is incorporated into a training corpus to refine and improve the generative model predictions in future training rounds.

2. The method of claim 1, further including automatically generating one or more container specification files for the codebase from one or more available data repositories.

3. The method of claim 1, further including identifying and extracting metadata related to the one or more changes or non-changes the codebase.

4. The method of claim 1, further including identifying, extracting, and committing the one or more changes in one or more source files of the codebase.

5. The method of claim 1, further including suggesting to the one or more container specification files to accept the one or more updates made in the codebase.

6. The method of claim 1, further including collecting labeled training data to train further machine learning models, including files of the codebase and metadata from one or more available data repositories.

7. A system for updating one or more container specification files in a computing environment, comprising:
    one or more computers with executable instructions that when executed cause the system to:
        learn embeddings from previous container specification files and train a generative model to predict container specification attribute values;
        automatically updating, by the trained generative model based on the container specification attribute values, one or more container specification files with one or more changes to a codebase, the codebase containing a history of changes to one or more files and metadata associated with the codebase containing a collection of source code; and
        enabling a user to provide feedback through a user interface to validate, adjust, modify, or amend the updated one or more container specification files, wherein the user feedback is incorporated into a training corpus to refine and improve the generative model predictions in future training rounds.

8. The system of claim 7, wherein the executable instructions when executed cause the system to automatically generate one or more container specification files for the codebase from one or more available data repositories.

9. The system of claim 7, wherein the executable instructions when executed cause the system to identify and extract metadata related to the one or more changes or non-changes the codebase.

10. The system of claim 7, wherein the executable instructions when executed cause the system to identify, extract, and generate embeddings for the one or more changes in one or more source files of the codebase.

11. The system of claim 7, wherein the executable instructions when executed cause the system to suggest to the one or more container specification files to accept the one or more updates made in the codebase.

12. The system of claim 7, wherein the executable instructions when executed cause the system to collect labeled training data to train further machine learning models, including files of the codebase and metadata from one or more available data repositories.

13. A computer program product for updating one or more container specification files in a computing environment, the computer program product comprising:
   one or more computer readable storage media, and program instructions collectively stored on the one or more computer readable storage media, the program instruction comprising:
      program instructions to learn embeddings from previous container specification files and train a generative model to predict container specification attribute values;
      program instructions to automatically update, by the trained generative model based on the container specification attribute values, one or more container specification files with one or more changes to a codebase, the codebase containing a history of changes to one or more files and metadata associated with the codebase containing a collection of source code; and
      program instructions to enable a user to provide feedback through a user interface to validate, adjust, modify, or amend the updated one or more container specification files, wherein the user feedback is incorporated into a training corpus to refine and improve the generative model predictions in future training rounds.

14. The computer program product of claim 13, further including program instructions to automatically generate one or more container specification files for the codebase from one or more available data repositories.

15. The computer program product of claim 13, further including program instructions to:
   identify and extract metadata related to the one or more changes or non-changes
to the codebase; and
   identify, extract, and commit embeddings for the one or more changes in one or more source files of the codebase.

16. The computer program product of claim 13, further including program instructions to suggest to the one or more container specification files to accept the one or more updates made in the codebase.

17. The computer program product of claim 13, further including program instructions to collect labeled training data to train further machine learning models, including files of the codebase and metadata from one or more available data repositories.

* * * * *